US008112508B1

(12) United States Patent
Ambrose et al.

(10) Patent No.: US 8,112,508 B1
(45) Date of Patent: Feb. 7, 2012

(54) DELIVERING DATA FROM DEVICE MANAGEMENT SERVICES TO DEVICES USING BULLETIN SYSTEM

(75) Inventors: Craig M. Ambrose, Saratoga, CA (US); Keith W. Clanton, Placerville, CA (US); John S. Evans, Mountain VIew, CA (US); Nawwar Kasrawi, Mountain View, CA (US); Timothy T. Sullivan, Portola Valley, CA (US)

(73) Assignee: Dell Products L.P., Round Rock, TX (US)

( * ) Notice: Subject to any disclaimer, the term of this patent is extended or adjusted under 35 U.S.C. 154(b) by 643 days.

(21) Appl. No.: 11/852,789

(22) Filed: Sep. 10, 2007

Related U.S. Application Data

(60) Provisional application No. 60/825,103, filed on Sep. 8, 2006.

(51) Int. Cl.
| | |
|---|---|
| *H04M 3/00* | (2006.01) |
| *G06F 15/177* | (2006.01) |
| *G06F 15/173* | (2006.01) |
| *G06F 15/16* | (2006.01) |
| *G06F 9/44* | (2006.01) |
| *G06F 9/445* | (2006.01) |

(52) U.S. Cl. ........ 709/223; 455/418; 455/419; 709/220; 709/221; 709/224; 709/248; 717/167; 717/168; 717/169; 717/170; 717/171; 717/172; 717/173; 717/174

(58) Field of Classification Search .................. None
See application file for complete search history.

(56) References Cited

U.S. PATENT DOCUMENTS

| | | | | |
|---|---|---|---|---|
| 5,577,244 A * | 11/1996 | Killebrew et al. | ............ | 717/169 |
| 5,623,604 A * | 4/1997 | Russell et al. | ................ | 717/167 |
| 5,835,911 A * | 11/1998 | Nakagawa et al. | ................... | 1/1 |
| 7,093,244 B2 * | 8/2006 | Lajoie et al. | ................... | 717/168 |
| 7,281,132 B2 * | 10/2007 | Bender et al. | ................. | 713/172 |
| 7,480,907 B1 * | 1/2009 | Marolia et al. | ................. | 717/174 |
| 7,546,595 B1 * | 6/2009 | Wickham et al. | ............ | 717/168 |
| 7,600,224 B2 * | 10/2009 | Obayashi et al. | ............. | 717/168 |
| 2003/0046434 A1 * | 3/2003 | Flanagin et al. | ............. | 709/248 |
| 2003/0221190 A1 * | 11/2003 | Deshpande et al. | .......... | 717/171 |
| 2004/0031029 A1 * | 2/2004 | Lee et al. | ....................... | 717/171 |
| 2004/0068724 A1 * | 4/2004 | Gardner et al. | ............... | 717/173 |
| 2004/0215755 A1 * | 10/2004 | O'Neill | ......................... | 709/223 |
| 2005/0132349 A1 * | 6/2005 | Roberts et al. | ................ | 717/168 |
| 2005/0132350 A1 * | 6/2005 | Markley et al. | ................ | 717/168 |
| 2006/0025123 A1 * | 2/2006 | Majmundar et al. | .......... | 455/419 |
| 2006/0075397 A1 * | 4/2006 | Kasahara | ....................... | 717/170 |
| 2006/0168574 A1 * | 7/2006 | Giannini et al. | .............. | 717/168 |
| 2006/0259604 A1 * | 11/2006 | Kotchavi et al. | .............. | 709/223 |

(Continued)

*Primary Examiner* — Ario Etienne
*Assistant Examiner* — Ho Shiu
(74) *Attorney, Agent, or Firm* — Workman Nydegger

(57) ABSTRACT

A system for targeting bulletins to specific electronic devices includes a device management ("DM") service, one or more electronic devices, and a database for storing bulletins. Generally, the DM service creates a bulletin, associating targeting criteria specifying one or more electronic devices with the bulletin. An electronic device submits a service request to the DM service identifying bulletins previously received (if any) by the device and a device identification number assigned to the device. Using the information from the service request, the DM service queries the database for bulletins available for the device. Upon locating an available bulletin, the DM service notifies the device and after receiving a request for the bulletin from the device, the DM service transmits the available bulletin. Alternately, the DM service can transmit the bulletin without first notifying and receiving a request from the device.

13 Claims, 7 Drawing Sheets

U.S. PATENT DOCUMENTS

2007/0232321 A1* 10/2007 Casati et al. ............... 455/456.1
2008/0052698 A1* 2/2008 Olson et al. ................... 717/168
2009/0055817 A1* 2/2009 Maj ............................... 717/173
2009/0070754 A1* 3/2009 Ichikawa ....................... 717/168

* cited by examiner

DELIVERING DATA FROM DEVICE MANAGEMENT SERVICES TO DEVICES USING BULLETIN SYSTEM

CROSS-REFERENCE TO RELATED APPLICATIONS

This application claims the benefit of U.S. Provisional Patent Application Ser. No. 60/825,103 filed Sep. 8, 2006, which application is incorporated herein by reference in its entirety.

BACKGROUND

1. The Field of the Invention

The present invention generally relates to wireless communication devices. In particular, embodiments of the invention relate to systems and methods for dynamically delivering targeted information from a device management service to a wireless mobile device using a bulletin system.

2. The Related Technology

As wireless consumer communication technologies implemented in mobile consumer devices such as satellite receivers, personal digital assistants, cell phones, etc., gain popularity across a broad spectrum of users, an ever increasing range of applications are being devised for implementation with such devices. As the devices become more popular and complex, there is an increased need for a service which can manage, control, and update the devices in an efficient way.

Typically, device management techniques require that devices perform specific processing commands when they receive them from the management service. Previously, such processing commands were distributed to all or the majority of the devices associated with the service, and involved only a limited exchange of dynamic information between the device and the management service. Because of the widespread distribution and general applicability of the processing commands, it was difficult for device management services to adequately and efficiently tailor processing commands to meet the requirements of each individual device.

For instance, two otherwise identical devices may be operating two different versions of a particular software application. Without a more targeted system designed to retrieve only the software updates required for each individual device, the devices would spend unnecessary time uploading content that was not required, and there would be more large data transfers to each individual device.

Conversely, in situations where there is a large group of devices requiring identical content or an identical service, there is a need for a content provider or a device management service that can efficiently notify and transfer the requisite data to the devices as a group.

Therefore, there is a need in the present art for more efficient means by which a content provider or device management service can provide targeted content to individual devices using an efficient bulletin system.

BRIEF SUMMARY OF THE INVENTION

These and other limitations are overcome by embodiments of the present invention, which relate to systems and methods for delivering data from a device management service to electronic devices using a bulletin system. The device management service allows a bulletin that needs to be sent to devices to be specified. The bulletins can provide a mechanism to deliver arbitrary data from the device management service to a targeted set of devices.

Generally, a device management service creates a notice of an event, called a bulletin, that may include an action, a schedule of the appropriate time for the action to be processed, and/or a listing of all devices requiring the execution of the action. For example, a bulletin may be used for software updates, user alerts, promotions, and the like. Further, the bulletin can provide flexibility in identifying the devices that should receive or process the bulletin.

Each time a device is connected to the device management service, the device management service determines whether there are pending bulletins for the connected device, and then transmits the bulletin to the device. The device management service may also perform authentication of the device or user such that only needed bulletins are transmitted to the device.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
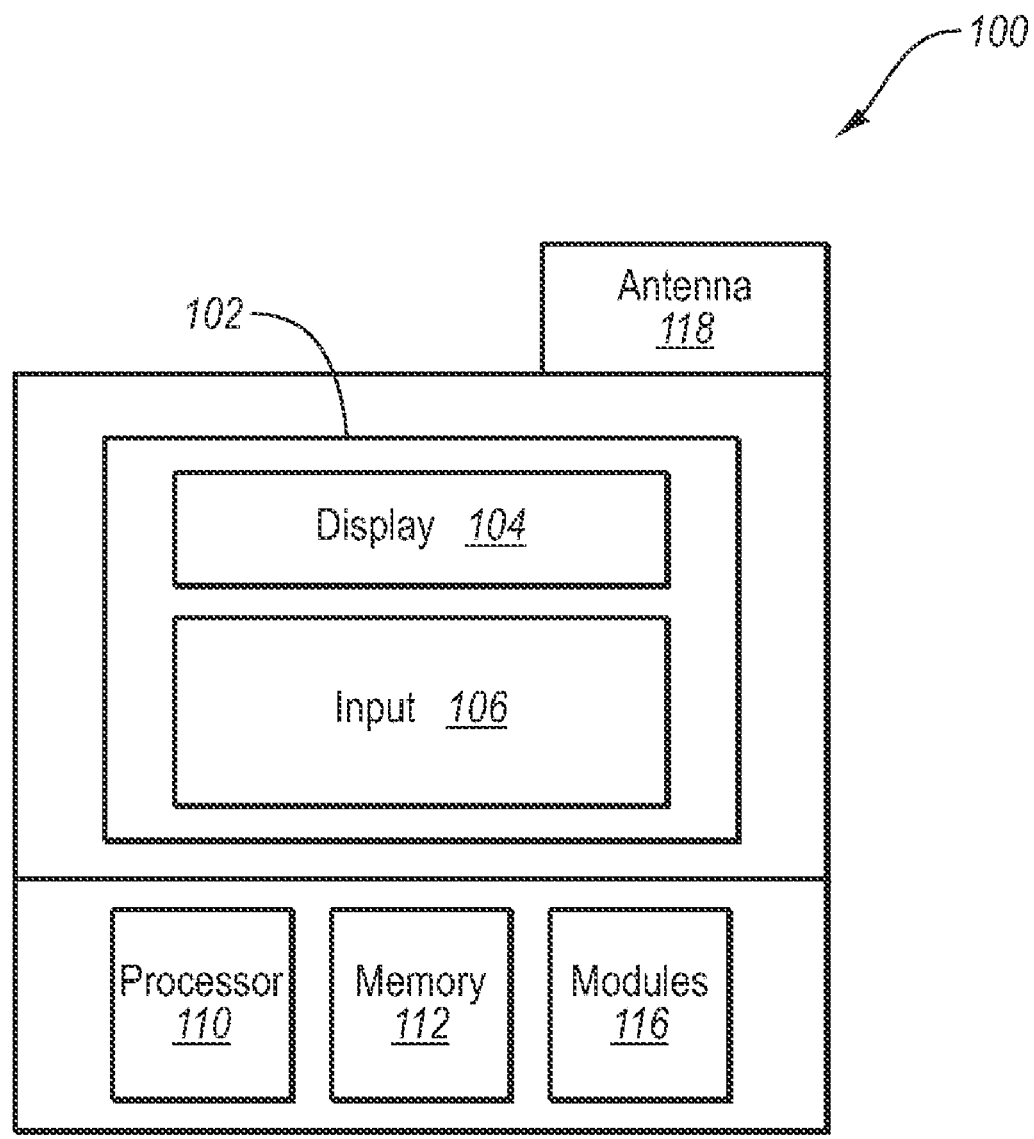
FIG. 1 is a block diagram of an example device that can be utilized in connection with embodiments of the present invention.

Embodiments of the invention relate to systems and methods for device management. More particularly, a device management service or server uses bulletins to provide various types of data or information to multiple devices of varying types. The bulletins can be dynamically targeted to the various devices.

Reference will now be made to the drawings to describe various aspects of exemplary embodiments of the invention. It is understood that the drawings are diagrammatic and schematic representations of such exemplary embodiments of the invention and, accordingly, are not limiting of the present invention nor are they necessarily drawn to scale.

FIGS. 1-7 depict various features of embodiments of the present invention, which is generally directed to systems and methods by which a device manager can provide data to a particular device or to a targeted group of devices. For example, a device manager uses a series of "bulletins" associated with arbitrary data from a device management service to deliver the arbitrary data to a targeted set of devices or to a particular device. Further, the device manager can make use of a bulletin numbering system to indicate which data has previously been received by the targeted device. Additionally, further embodiments of the present invention can make use of a method of associating the identification number of devices (e.g., IP connected devices) to a larger group, category, or pack of devices and using these associations to target only the devices which require particular bulletins.

Though described herein in connection with a mobile electronic device in the form of a WiFi-enabled personal music device, one of skill in the art, with the benefit of the present disclosure, will appreciate that embodiments of the invention can be practiced in conjunction with other devices that may include, but are not limited to, personal digital assistants, cellular telephones, personal audio devices, satellite radios, and the like or any combination thereof. Accordingly, the following discussion should not be construed to limit the present invention in any way.

Embodiments of the invention provide for a mobile electronic device that serves as a platform for the receipt and transmission of digital content. As used herein, "content" includes digital or analog audio/video/text data in various formats, images in various formats, data transmitted using or via satellite, cellular networks and other RF networks including 802.xx networks, the Internet and World Wide Web, and the like or any combination thereof.

One embodiment of the present invention includes a mobile electronic device implemented as an 802.11-enabled personal audio/video device that can receive content over a wireless network, one example of which is a "WiFi" network. The content can be delivered by various content providers. Embodiments of the invention can also dock with another device such as a computer for various reasons (e.g., altering stored content, synchronization, backup) and perform in a similar manner over the computer's connection.

FIG. 1, for example, illustrates one embodiment of a mobile electronic device ("device") 100 that can be utilized in connection with one or more embodiments of the present invention. The device 100 includes a user interface 102 that includes a display 104 and an input mechanism 106. The input mechanism 106 may include, but is not limited to, a click wheel, buttons, soft keys, and the like or any combination thereof. By operating the user interface 102, a user can navigate content stored on the device, configure device settings, select channels, select specific networks, and the like.

The device 100 is a network connectable device. Thus, the device 100 may include a connection for accessing one or more wired and/or wireless networks. The device, for example, may include the ability to access multiple types of wireless networks, including 802.xx related networks (e.g., WiFi) and others using the antenna 118, which may be part of the connection. The device 100, in addition to 802.11 type networks, may have access to other radio frequency networks such as a cellular network, a satellite network, and/or terrestrial RF networks (e.g., WiMAX, AM, FM, DAB (digital audio broadcasting)). Further, the device 100 may have access to one or more hardwired networks.

The device 100, for example, may be able to access the Internet through a wireless access point (e.g., a WiFi hotspot). Once connected to the Internet, the device 100 may interact with multiple content providers. In one embodiment, the device 100 may access satellite broadcast content over the Internet rather than over a satellite network. The device 100 may also be able to access terrestrial radio broadcasts (digital radio, FM, AM, and the like). Further, the device 100 may also be able to receive and provide other media content, such as World Wide Web content, television content, video content and the like or any combination thereof.

In one example, the device 100 may be a wireless-enabled personal music device that can access media content through the Internet using wireless network connections including WiFi wireless connections. The user of the device 100 can access media content whenever the device 100 is within range of a wireless access point or whenever access to a network is present.

The device 100 further includes a processor 110, memory 112, and various modules 116. The modules 116 represent the software or computer executable instructions that, when processed, cause the device to access networks, download content, manage content, provide and control the user interface including the display 104, record media content, and the like or any combination thereof. The memory 112 may store media content from the user's library on another device or may store a library of media content that has been recorded or purchased over the wireless connection or that has been shared with the device 100 from another user.

Figure 2:
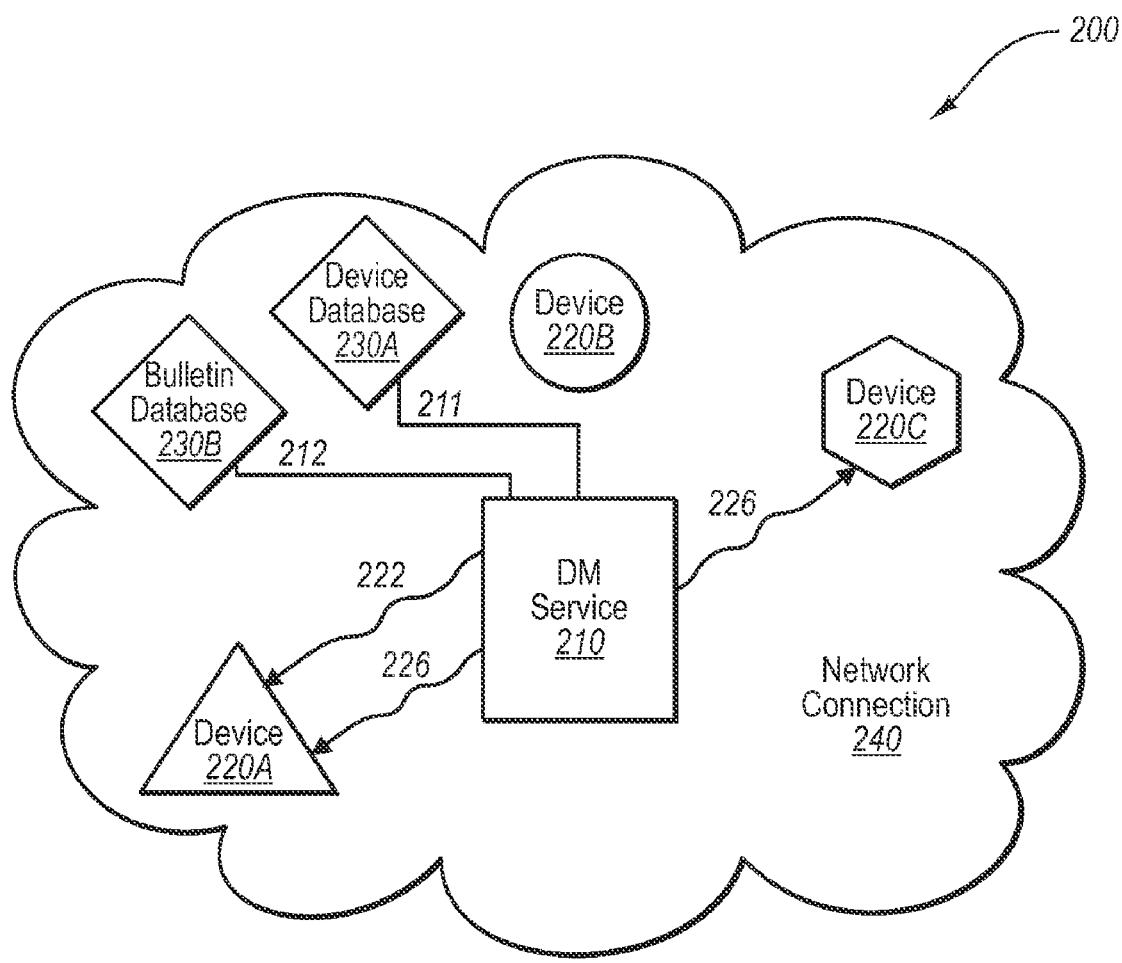
FIG. 2 is a block diagram of one example operating environment wherein embodiments of the present invention can be practiced.

Reference is now made to FIG. 2, which depicts various details regarding an example environment, generally designated 200, in which embodiments of the present invention can be practiced. In one particular embodiment, the environment 200 can be utilized to enable a device management service or "DM service," designated 210, to transmit content to one or more mobile electronic devices that are connected to the DM service 210 as described below. The DM service 210 is able to target particular devices for the receipt of data, or bulletins, which may include specific content and a schedule for processing the content. Embodiments of the invention enable the DM service 210 to more quickly and efficiently transfer content to each device.

In particular, the environment 200 shows example mobile electronic devices 220 that are connected to the DM service 210 or that can access the DM service 210. In particular, FIG. 2 shows three devices 220A, 220B, and 220C that are connected to the DM service 210 using a wireless connection 240, although it is understood that other methods may be used, and it is likewise appreciated that more or fewer devices may be connected to the DM service 210 at any given time. Additionally, the devices 220 and other devices connected to the DM service 210 can be detected and monitored in any suitable manner. Accordingly, the DM service 210 is configured to include all necessary computer components, both hardware, and software, to enable such device monitoring communication, including any authentication measures used to ensure the security of transmissions between the DM service and the device 220.

As more fully described below, the DM service 210 utilizes a bulletin system to target specific devices for receipt of particular content. In FIG. 2, the device 220A is shown connected to the DM service 210 and requires additional content specific to the device 220A. The DM service 210 receives a request for additional content from the device 220A, the request including at least a device ID associated with the device. The DM service 210 uses the device ID to query 211 a device database 230A for targetable characteristics of the device (e.g., device characteristics which can be used to target a bulletin). In one embodiment, the device database 230A is indexed by device ID. Targetable characteristics include the device ID itself, a device type, device category, device group membership, device pack assignment, and the like or any combination thereof.

Upon receiving a request for additional content from the device 220A, the DM service 210 next transmits a request 212 based on the identified targetable characteristics of the device 220A to a bulletin database 230B to retrieve applicable bulletins, if any, requesting the desired content. The bulletin database 230B is indexed by device ID and targetable characteristics in one embodiment. Once identified, an applicable bulletin (or content specified in the bulletin) can be retrieved after retrieving the desired content from the bulletin database 230B. Then, the DM service 210 has the ability to send the device specific content in the form of a bulletin, indicated at 222, to the device 220A, which is performed as described below.

A second device 220B is also shown in FIG. 2. However, the DM service 210 many not need to send additional content to the device 220B at this time. As such, no additional content or bulletins are sent by the DM service 210 to the device 220B via the wireless connection 240.

A third device 220C is shown in FIG. 2. Similar to the communication between the DM service 210 and the first device 220A, the third device 220C is connected to the DM service 210 and is of a desired device type for additional content. According to FIG. 2, the first device 220A and the third device 220C each require the same content from the DM service 210 (e.g., based on one or more targetable characteristics of each device specified in the corresponding bulletin). Thus, the DM service 210 retrieves the bulletin corresponding to the requisite data, designated 226, from the bulletin database 230B, and delivers the bulletin 226 to both the first device 220A and the second device 220C. As can be seen, the bulletin 226 delivered to the second device 220C is in addition to the bulletin 222 delivered solely to the first device.

Note that, while FIG. 2 employs a particular wireless network configuration, in other embodiments the DM service can employ other network configurations to transmit content to specific or targeted devices. These alternative network configurations include, for example, cellular, cable, DSL, and satellite networks, to name a few.

Moreover, the devices 220 can be considered consumer, commercial, governmental, military, or other devices, having varying purposes of functionality.

Figure 3:
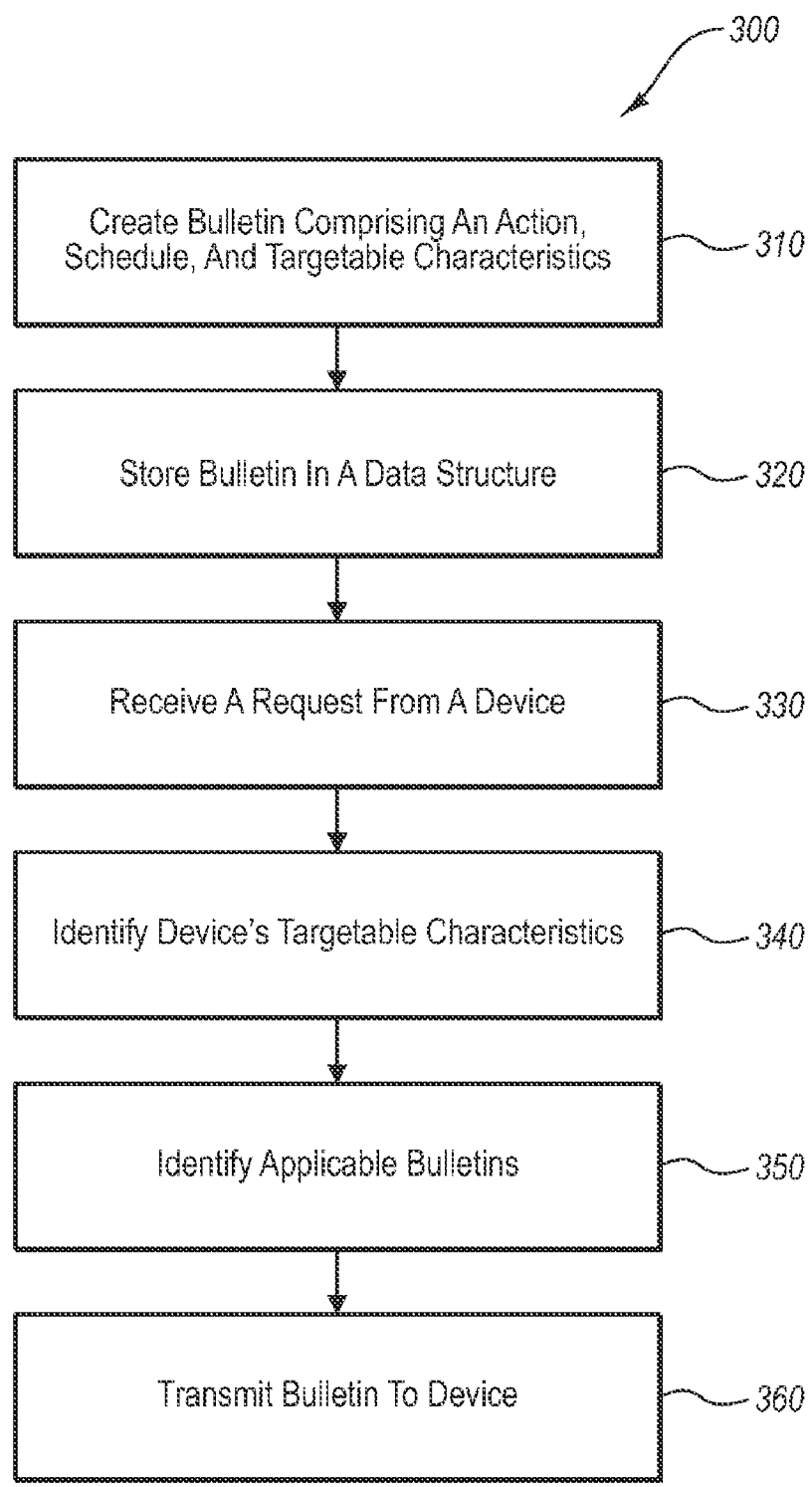
FIG. 3 is a flow chart illustrating various stages of one embodiment of a method for delivering data from a device management service to a mobile electronic device.

Together with FIG. 2, reference is now made to FIG. 3, which shows various stages of a method, generally depicted at 300, for transmitting content to a wireless device, such as the mobile electronic device 220A. In stage 310 a bulletin is created, by way of example only, by an administrator, partner, or customer service representative. A bulletin 500, shown in FIG. 5, typically includes an action to be processed by a device 510, a schedule indicating the time when the action should be processed 520, and/or one or more targetable characteristics of devices that need to process the action 530. The action to be processed by a device 510 may be or may include the content or data intended for the device. For example, the action to be processed 510 may be an upgrade to the firmware of the device. In this example, the action 510 may include the upgrade itself as well as information identifying the action. Alternatively, the action 510 may contain a reference to a URL that the device should request to retrieve the necessary content to fulfill the bulletin.

The action corresponding to each bulletin may be, by way of example and not limitation, a software update, a promotional item (e.g., an advertisement), an alert (e.g., a message for the user), an asset update (e.g., a collection of assets that need to be updated on the device including graphics, media, and/or executables), a setting change (e.g., changes to the registry of the device), a user survey, or commands to be processed by the device. The schedule corresponding to each bulletin indicates the urgency with which the device needs to respond to the bulletin and the priority of the action.

According to one embodiment of the present invention, the bulletin may include either an "Interrupt" or "Queue" priority indicating whether the bulletin should be processed immediately by the device, or added to a bulletin queue for later action based on a specified time validity range. Additionally, bulletins may be scheduled to become active in the DM service 210 during one time period and active in the device during another time period. For example, a bulletin may be downloaded when the device 220 has connectivity to the DM service 210 and processed at a later time.

As previously mentioned, each bulletin includes one or more targetable characteristics of devices requiring a specific action. According to one embodiment of the present invention, bulletins can be addressed, or targeted, to all devices, the collection of servers that is providing service to one or more devices (such collection referred to as a "pack"), a single device, a type of device, a set of device types (called a "device category"), or other group, by associating the device's identification number with each group, type, set, pack, category, etc. This association is accomplished in one embodiment by storing any groups, types, sets, packs, categories, and the like of a device in the device database 230A by device ID. By associating these groups, types, sets, packs, categories, etc. of devices (referred to herein as "targeting criteria" or "targetable characteristics") with particular bulletins, the DM service 210 may target bulletins to any number of devices, creating a more efficient way to manage a large number of devices. For example, by creating a group of devices that are currently running the same version of a particular software application, the DM service 210 may create a single bulletin associated with appropriate upgrades to all the devices in need of the software upgrade. Advantageously, the upgrades can be transmitted to/downloaded by only those devices within the group.

Furthermore, the DM service 210 may create a hierarchy of groups wherein larger groups of devices are themselves comprised of smaller groups of devices. As such, it is possible for a single device to be associated with any number of groups and for each device to be joined or removed from any group without affecting the device's association with any other group.

In any event, a particular bulletin (e.g., bulletin 222 or 226) is created at step 310. At stage 320, the bulletin can then be stored in the database 230B, which database may be examined at any time by the DM service 210 to determine if there are any necessary bulletins pending for a particular device (e.g., device 220A, 220B or 220C). In one embodiment, the bulletins are indexed in the database 230B by targetable characteristics specified in the bulletin. Thus, once the DM service 210 identifies the targetable characteristics of a particular device, these characteristics can be used to search the database 230B for any bulletins targeted to the device.

As shown in FIG. 3, at stage 330 the DM service 210 receives a service request from a device. The service request includes the device ID of the device and may additionally include versions of software currently running on the device and a "high-water mark." The high-water mark identifies the highest numbered bulletin already received and processed by the device and can be used by the DM service 210 to determine which bulletins need to be transmitted to the device. Thus, the service request provides a way to identify which bulletins have been received and processed by a device and a way to identify bulletins that have not been received by the device without requiring the DM service to store that information. Because the DM service 210 may have many bulletins that are not intended for a particular device, the marking system provides a way for the DM service to more easily identify required bulletins. This ensures that the device only receives and processes needed bulletins, thereby conserving bandwidth. In some instances, the burden of ensuring that the proper bulletins are processed can be placed on either the device or the DM service.

After receiving the service request from the device, the DM service 210 then determines or identifies all targetable characteristics of the device at stage 340. This may comprise, for example, using the device ID received in the service request to query the device database 230A for all targetable characteristics of the device.

The identified targetable characteristics of the device (including the device ID) and the high-water mark can be used at stage 350 to search the bulletin database 230B for applicable bulletins, if any. For instance, if a particular bulletin has a higher number than the high-water mark from the service request, but it is not targeted to any of the device's identified targetable characteristics, then the bulletin will not be transmitted to the device. Similarly, if a particular bulletin is targeted to one or more of the device's identified targetable characteristics but is of a lower number than the high-water mark, the bulletin is not transmitted to the device.

However, if a particular bulletin has a higher number than the high-water mark and is targeted to one or more of the device's identified targetable characteristics, the DM service can transmit the bulletin to the device at stage 360. The content associated with the bulletin and/or included in the bulletin can then be handled by the device 220A as described above. As mentioned above, restrictions may be placed on the bulletins, such as a time limit for execution of the associated action, etc. Additionally, the DM service may also stop the execution of currently-active or scheduled bulletins that have already been retrieved by the device.

In some embodiments, the bulletin may not be transmitted to the device until after various communications are exchanged between the device and the DM service, as described below with respect to FIGS. 4 and 6. Further, in some instances the DM service 210 may identify multiple applicable bulletins at stage 350. In this case, when the DM service transmits 360 a particular bulletin to a device, it may include a notification that one or more additional bulletins are available for the device to receive.

Another feature of the present invention is the ability to create dependencies within the bulletin system. This is useful when a bulletin requires the execution or completion of a previous bulletin before the latest bulletin can be processed. For example, a bulletin associated with a change in a device's registry may only be relevant if a certain software upgrade has previously been applied. Thus, according to embodiments of the invention, a dependent bulletin may have one or more dependencies, each requiring execution before the dependent bulletin may be processed. Advantageously, embodiments of the invention can ensure that devices are updated in a common manner and ensure that updates, alerts, etc., are processed in a particular order.

Enforcing the order of processing bulletins can be accomplished, in one embodiment, by notifying a device of one or more dependencies while transmitting a dependent bulletin. The device can then request and process the one or more dependencies in the order specified in the notification, prior to processing the dependent bulletin. Alternately or additionally, the order of processing bulletins can be enforced entirely by the DM service 210. In this case, the DM service transmits dependent bulletins to the device only after the device indicates that the one or more dependencies have been processed.

The DM service may use the high-water marking system to construct a "smart bulletin" which will include all available and targeted actions pending for the device. For example, if the targeted action includes a software update, the DM service can analyze pending bulletins relating to the specific device's software and transmit data relating only to the most relevant versions of software for a device after having first received a service request that identifies the versions of software currently running on the device. In other words, the DM service can dynamically modify a bulletin to include or ignore software components. For example, if the device already has a particular version of an application, then the DM service may exclude that component from the bulletin for that device. If there are multiple software upgrade bulletins for a device, the most recent and targeted components can be constructed into a dynamic bulletin for that device. For example, the DM service may create a bulletin containing only the URL references to the software components that are necessary to bring the device up to date. Advantageously, this reduces interactions to the DM service and reduces the number of large downloads to a device. Additionally, this method can be utilized to create a device recovery mechanism for restoring corrupted software. For example, a device owner may contact a customer service representative who then creates a bulletin for the corrupted device that contains URL references to software components required to replace the corrupted processes.

Similarly, another embodiment of the invention includes the ability to create "sync bulletins" for use when the DM service initially associates a device with a group. In such scenarios, it is important that the newly added device has access to all bulletins previously sent to the group. Thus, when a device is added to a particular group, pack, or set, the DM service can construct a sync bulletin that includes dependencies to all bulletins that the DM service previously sent to the group, pack, or set. These dependencies enable the newly-added device to process all relevant bulletins previously sent to members of the group that the device has not previously processed in order to ensure that the device is in-sync with each of the other devices in the group, pack, or set.

Figure 4:
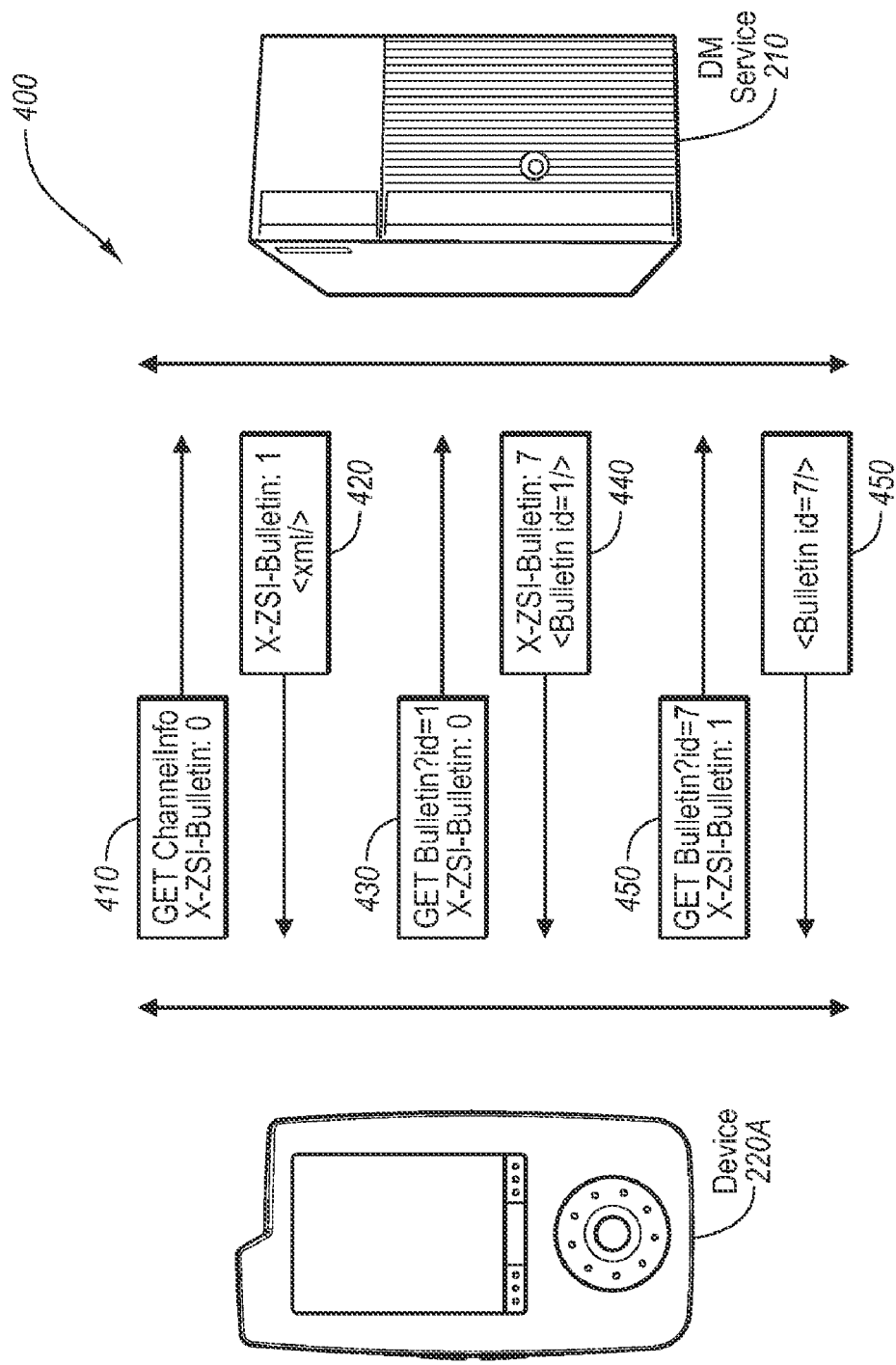
FIG. 4 is a flow chart illustrating examples of data transfers from a device management service to a mobile electronic device.
Figure 5:
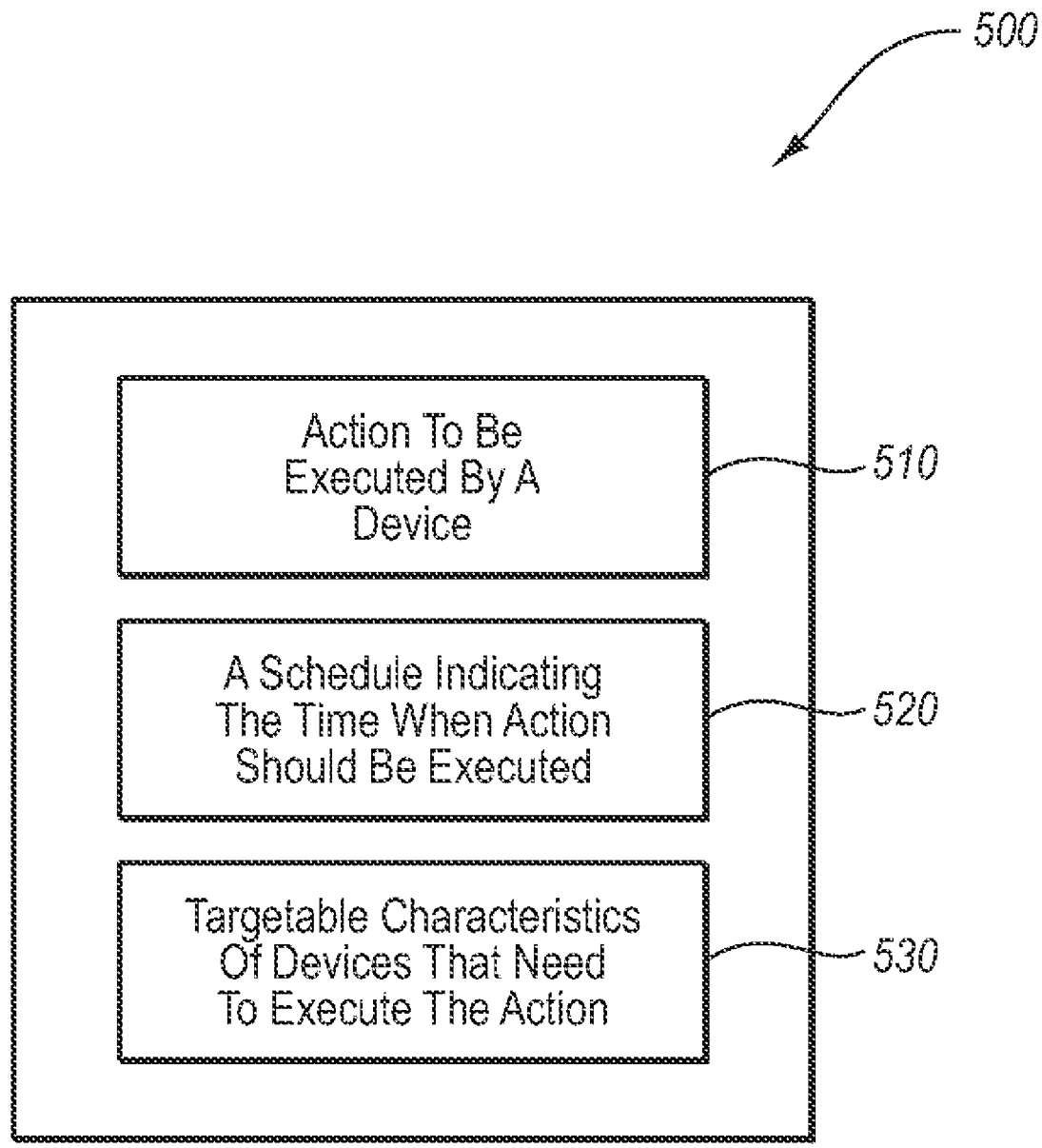
FIG. 5 is a block diagram of an example bulletin that can be used in connection with embodiments of the present invention.

Together with FIGS. 2 and 3, FIG. 4 is a flow chart illustrating signal flows of a specific example of the method for providing targeted data from a device management service to a specific device in accordance with one embodiment of the present invention.

At stage 410 the portable electronic device 220A, which is connected to the DM service 210, sends a service request 410, which includes a listing of the highest-numbered received bulletin, which in this example is "Bulletin: 0," to the DM service 210. The numbering may indicate that the device has not yet received any bulletins from the DM service 210 or it may simply be the latest high water mark. The service request additionally includes a device ID of the device 220A.

At stage 420, the DM service responds to the communication received during stage 410 by running a query of the device database 230A (to identify targetable characteristics of device 220A) and then a query of currently available bulletins in the bulletin database 230B to determine if there are any outstanding bulletins for the device 220A. Upon determining that there are pending bulletins for the device, the DM service 210 sends a communication indicating that there is a bulletin, "Bulletin: 1", pending for the device.

At stage 430, the device 220A requests the bulletin ("Bulletin 1"). The request, as described above, may be for the bulletin 1 which includes the payload or data needed by the device 220A (e.g., changes to the device's settings), or conversely the bulletin may include URL references to locations where the data is located (e.g. references to software components needed to complete a software upgrade). At stage 440, the DM service 210 sends the requested data, and determines that the device 220A needs an additional bulletin ("Bulletin: 7") and sends a communication to the device 220A indicating that "Bulletin 7" is pending for the device.

At stage 450, the device 220A sends a request for the latest bulletin 7 with a header indicating that the highest-numbered bulletin processed by the device 220A was "Bulletin: 1." At stage 460, the DM service 210 responds to this communication by transmitting the data associated with "Bulletin: 7."

Generally stated, a device connects with a DM service and through a service request, provides the high water mark number or identifier that identifies the bulletins received by the device. The DM service 210 also identifies a device ID from the service request. Using this information (e.g., high-water mark and device ID), the DM service 210 can respond with the next bulletin that is targeted to the device. At this point, the device can then request those bulletins and process them. Alternatively, the DM service can send a bulletin that includes the needed data immediately after receiving the service request without first identifying the available bulletins for the device and waiting for the device to request the identified bulletins. The device can then update the high water mark identifier and repeat this process to identify any bulletins that are intended for the device and that have not been processed.

Together with FIGS. 2-5, FIG. 6 is a flow chart illustrating signal flows of a specific example of the method for providing targeted data from a device management service to a specific device in accordance with an embodiment of the present invention where a device is added to a group or pack and a sync bulletin is created.

After the DM service joins the device, say 220B, to a pack or group of devices which have previously received a series of bulletins, the DM service creates a sync bulletin with dependencies to all relevant bulletins previously sent to members of the group. At step 610, the device 220B is connected to the DM service 210. The device 220B sends a service request including the device's identification number and the highest-previously processed bulletin number, shown here as "Bulletin: 8." In this example, "Bulletin: 8" is chosen as an arbitrary number and may represent any bulletin number or may indicate that the device 220B has not yet received any bulletins from the DM service 210.

At stage 620, the DM service 210 responds to the device 220B by communicating that there is a pending bulletin, shown here as "Bulletin: 12," pending for the device.

In response, at stage 630, the device 220B requests bulletin 12. At stage 640, the DM service 210 sends the requested bulletin which includes a notification that bulletin 12 has dependencies to bulletins 10 and 11, shown in FIG. 6 as "Bulletin 10," and "Bulletin 11." In one embodiment, the notification of the dependencies is contained in XML that describes bulletin 12 to the device.

At stage 650 the device 220B requests the first dependency ("Bulletin 10") per the notification, the request indicating a new high-water mark corresponding to Bulletin 12. At stage 660, the DM service 210 sends the requested data.

At stage 670, the device 220B sends a request for the bulletin 11, the request indicating the high-water mark corresponding to Bulletin 12. At stage 680, the DM service 210 responds to this communication by transmitting the data associated with "Bulletin: 11" to the device 220B. In this manner, a device joined to a pack or group can receive all necessary bulletins so as to be up to date with other devices in the same pack or group.

Figure 6:
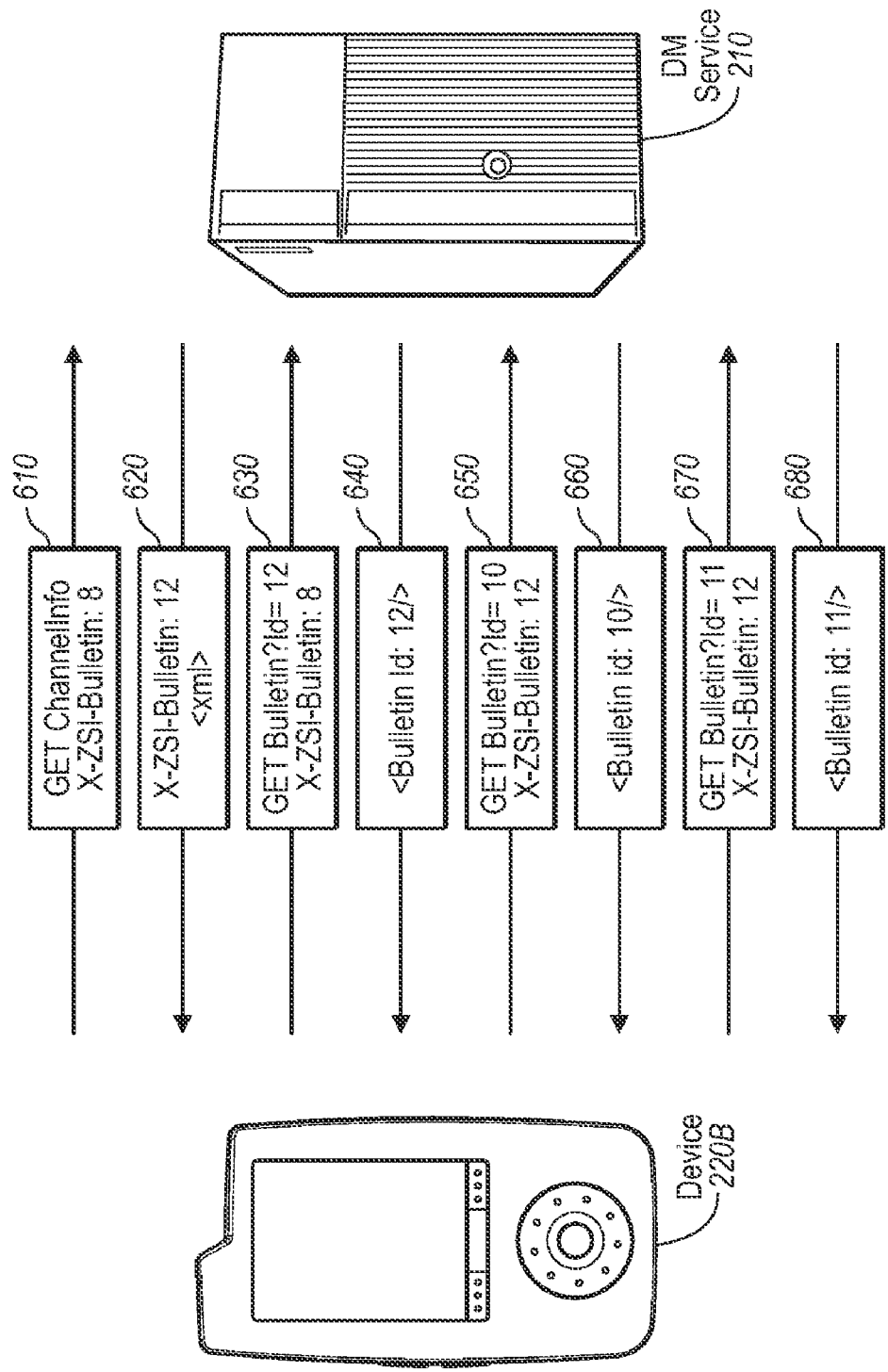
FIG. 6 is a flow chart illustrating examples of data transfers from a device management service to a mobile electronic device according to an additional embodiment of the present invention.

According to the embodiment of FIG. 6, the device 220B is configured to process and request bulletins according to dependencies of which the device is notified in a dependent bulletin. However, as mentioned above, the DM service can alternately be responsible for ensuring that bulletins are processed in a particular order. Thus, rather than sending a dependent bulletin (e.g., bulletin 12) to a device and letting the device request all dependencies (e.g., bulletins 10 and 11) in order, the DM service could send each bulletin in order, withholding a subsequent bulletin until receiving a request from the device indicative that the previous bulletin has been processed.

The following example illustrates bulletins used when a device switches groups, for example. At any point in time the Service database contains bulletins that are targeted to devices by: a) Device Category; b) Device Type; c) Device ID (i.e. list of exact device IDs or radio IDs); and/or d) Device Group (a device can be added to a group by some arbitrary relationship, e.g. Beta testers). When a device is added to a group or changes groups or is moved to another pack, etc., a "Group Sync" bulletin is created.

The Group Sync bulletin may include a list of dependencies, where the dependencies are all active bulletins that have been specifically targeted to the group that the device is being associated with. The Group Sync bulletin is put on the Service's bulletin queue with all of the other active bulletins. During the normal flow of bulletin processing, the device will eventually be told about and then request the Group Sync bulletin.

When the device sees that this bulletin contains dependencies, it is the device's responsibility, in one embodiment, to request each of those dependent bulletins and process them. If the device has already processed one of the dependencies, then the dependency is considered "resolved" and the other dependencies are examined. The device typically does not consider the "Group Sync" bulletin complete until all of the dependencies have been resolved.

For example, suppose the Service bulletin database includes the following bulletins:

| Bulletin ID/Sequence | Type | Targets | Dependencies |
| --- | --- | --- | --- |
| 1 | Firmware | Group A | none |
| 2 | Alert | Group A | none |
| 3 | Alert | Group B | none |

At this point, assume Device X is in Group B and has already been communicating with the Service. The device will have processed its bulletins and will be up to high-water sequence number 3. So, with every request to the service the device will indicate that the last bulletin it has processed is "3". It uses the Bulletin request header for this. Device X has never known about the existence of bulletins #1 or #2.

Now suppose the device is associated to Group A. By doing so, a Group Sync bulletin is automatically created by the DM service and the bulletin database would include the following:

| Bulletin ID/Sequence | Type | Targets | Dependencies |
|---|---|---|---|
| 1 | Firmware | Group A | none |
| 2 | Alert | Group A | none |
| 3 | Alert | Group B | none |
| 4 | ZCL | Group A | 1, 2 |

The next time Device X makes a request to the Service, the Service will indicate through a response header that bulletin #4 is pending for the device. The device requests bulletin #4 and sees that it has a dependency on #1 and #2. The device has no record of those bulletins so it requests and processes each of those bulletins. Once those dependent bulletins have been processed bulletin #4 can be considered complete and now the device will send #4 as the high-water mark for processed bulletins.

Figure 7:
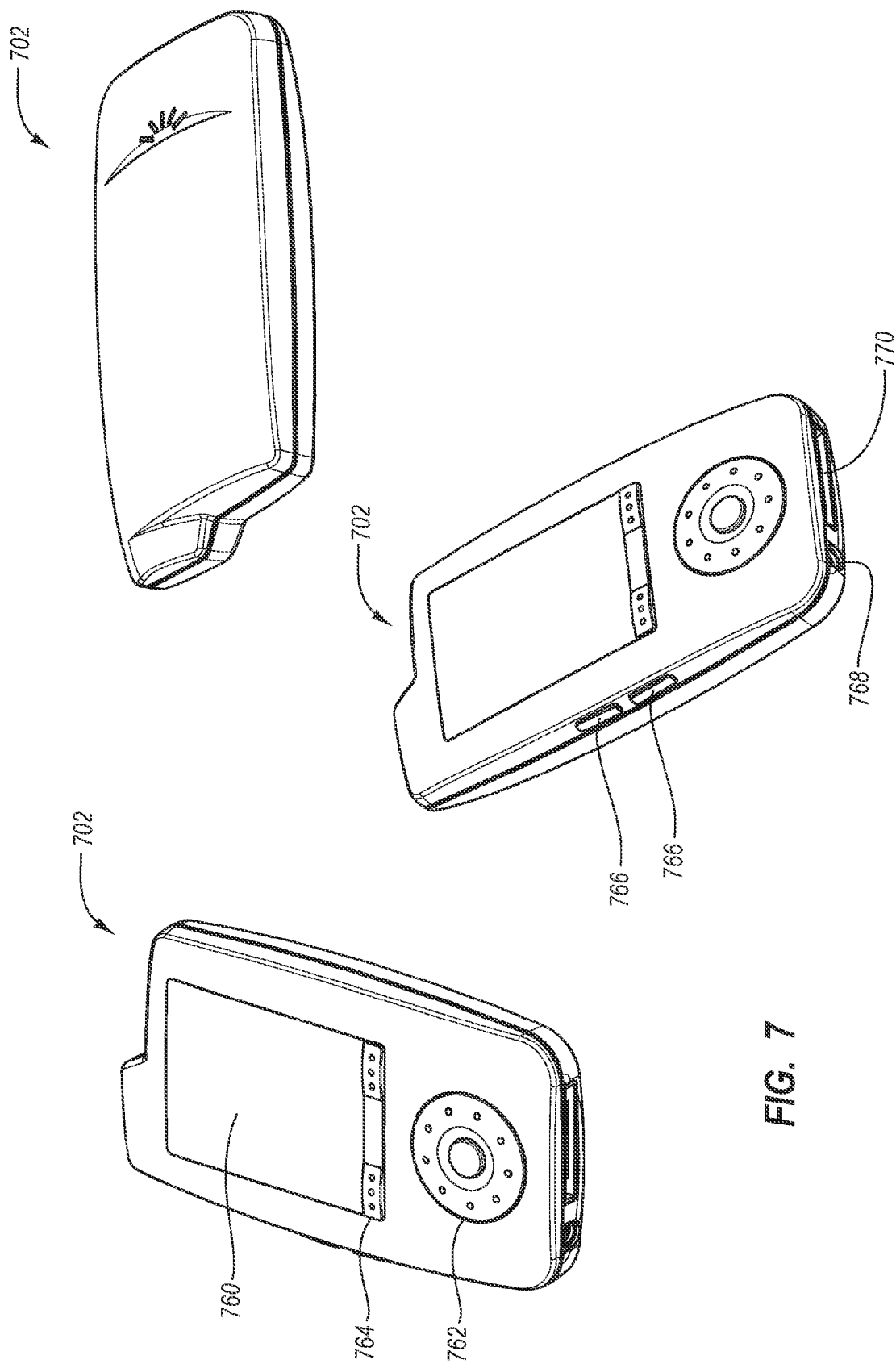
FIG. 7 depicts perspective views of one example of a mobile electronic device that can be used with embodiments of the invention

FIG. 7 illustrates perspective views of one embodiment of a mobile electronic device with display and navigation mechanisms that can be used in conjunction with the features of the present invention to receive and request bulletins. The device 702 includes a display 760 having various display methods. A user can interact with audio device 702 using a touchpad 762, electro-mechanical keys on a keypad, such as arrow keys and alphanumeric keys, soft keys 764 on display 760, a navigation wheel, other device buttons 766, a remote control device (not shown) associated with the audio device 702, voice commands, or by moving the communication device in a particular way. The audio device 702 may also include port 768 for connecting audio headgear and port 770 for connecting the audio device 702 to a docking station or connector for charging the audio device. Of course, audio device 702 can include any of a variety of configurations and designs that are contemplated within the scope of the present invention.

The above description relating to methods of delivering data from a device management service to an electronic device using a bulletin system is meant to be illustrative of the principles of the present invention, and it is appreciated that various modifications may be made to the embodiments while still remaining in accordance with the principles of the present invention. With that in mind, various aspects of the invention will be described with respect to the following three examples.

EXAMPLE 1

While using a device it may become useful or necessary to alert the user or the device of events through the use of bulletins. These bulletins can be initiated by a service-side application such as a survey or could be part of system maintenance. This example describes the class of bulletins, what level of user interaction is required, how bulletins can be triggered or scheduled, etc.

Bulletin Manager: A bulletin manager or device management service allows an administrator, partner or customer service representative to specify a bulletin that needs to be sent to devices. A bulletin consists of an action, a schedule, and target devices. The device management service receives user input creating the bulletin and stores the bulletin in a database (e.g., a bulletin database). Upon receiving a service request, a service response mechanism of the device management service queries the database to determine if there are any necessary bulletins that a particular device needs to know about.

The priority of a bulletin indicates how the device responds. There may be an interrupt mode which requires the device to stop what it is doing and execute the bulletin. There may also be a queue mode where the device can execute the bulletin later. The action of a bulletin indicates what it is that the device needs to do; update firmware, notify the user, change some settings, etc. The schedule of the bulletin indicates the urgency with which the device needs to respond and when it should present the information to the user including:

Priority—INTERRUPT, QUEUE

Start Date/Time—time when a bulletin becomes active both on device and service

End Date/Time—time when a bulletin expires at which point it should be removed from both the service-side queue and any device queues that it may reside in. Bulletins are examined on the service when a response is constructed for a device and any expired bulletins will be removed.

Bulletin Types: Examples of 6 types of bulletins that can be delivered to a device:

1) Alert—a message that is to be displayed to the user
2) Asset Update—a collection of assets that need to be updated on the device including graphics, media, and/or executables
3) Firmware—an upgrade to software running on the device
4) Setting—a change to the device's registry
5) Survey—a question and answer collection that will prompt the user for input
6) ZCL—(ZING Command Language) commands that are to be executed by the device Bulletin Targeting: When a device communicates to the service it will meet certain targeting criteria, which is used to target bulletins. As used herein, "targeting criteria" and "targetable characteristics" may be used interchangeably. The following targeting criteria may be associated to a bulletin:

1) Device Category—each device ID belongs to a device category and a bulletin can be targeted to one or more categories
2) Device Type—each device ID belongs to a device type which is a subset of the device category and a bulletin can be targeted to one or more device types
3) Device ID—a bulletin can target one or more specific device Ids
4) Partner ID—an external partner ID is associated with each device ID and the partner IDs can be used for bulletin targeting
5) Device Group—a device ID can be assigned to a group and a bulletin can target one or more groups
6) Pack—a collection of service software is grouped into a pack and a bulletin can be targeted to one or more specific packs.

These device targets can be grouped together to make arbitrary targets for the bulletins. It is understood that the targeting criteria identified above simply provide means for creating associations (e.g., between devices) in order to target bulletins with any desired level of granularity and that many possible attributes may be used to create these associations. For instance, a bulletin can target devices running a particular version of software.

Service Response Header: On every request the device makes to the service a proprietary header is included indicating the highest numbered bulletin a device received. The service will take this high-water mark into account in determining if there is a bulletin pending for the device. A special header is returned by the service on every response to the device when there is a bulletin pending for the device.

Dependencies: A bulletin may need to depend on the execution and completion of a previous bulletin before it can be processed. For instance, a change to the registry may only be relevant if a certain software upgrade has been applied. A bulletin can include one or more bulletins as dependents. The device's responsibility is to ensure that a bulletin has been fetched, executed and completed before any dependent bulletins can start processing.

Syncing Targeted Bulletins: A device can be moved from group to group and between packs. This can result in a device that was recently added to a group or migrated to a pack to miss bulletins or to be out of sequence with dependencies. Thus, when a device's group is switched or when it is migrated to a different pack, a "Sync" bulletin can be created that includes dependencies on all bulletins that are targeted to the group or pack. This enables the device to retrieve and process those dependent bulletins and hence be re-synched with the current active bulletins.

Smart Software Updates: A service can have more than one software update pending for a device. In order to limit the number of times the device has to retrieve software and execute the upgrade process, the service can construct a "Smart Update" which includes available and targeted components for the device which are newer than the versions of software the device is currently running. As mentioned above, the device's software versions can be communicated to the service in the device's service requests. The service uses the current running versions of software that the device reports to go through the active bulletins that are targeted to the particular device and determine the most relevant versions of software for a device.

Device Responsibilities:
Examine each response from the service for the X-ZSI-Bulletin header field.
If there is an "interrupt" level bulletin pending, the client will respond to the communication with an exception and begin processing the bulletin.
If there is a "queue" level bulletin the service layer on the client will begin a process of requesting the bulletin from the service. Some of these bulletins will be stored on the device in a bulletin queue because their schedule specifies that they are not yet active.

EXAMPLE 2

In another embodiment, the protocol used to update a device or a group of devices often begins when a device issues a get request (Device.Get( )). The service responds with a bulletin (Service.Response( )). To ensure that the bulletin is properly processed, the device may acknowledge that it has received the response or bulletin (Device.ACK( )). The device acknowledgement ensures that the device acknowledges that it has received the bulletin or the response from the server. In some instances, the acknowledgement may also indicate that the device has properly processed the bulletin. If the processing of the bulletin is not successful or is delivered, for example, to the wrong device, then a non-acknowledgement (NACK) can be sent. For example, a NACK may be generated if the device determines that the checksum is wrong or there is a failure at any stage of the communication.

EXAMPLE 3

One embodiment of the schema used to deliver bulletins is as follows: Device.GetBulletin (lastReceivedBulletinID); Service. SendBulletin(ID,payload); Service. SendBulletin (ID,<sync>); and the device may then perform Device.ProcessBulletin(ID). In one embodiment, the device may then issue Device.GetBulletin(lastReceivedBulletinID, lastProcessedBulletinID), where lastProcessedBulletinID is the ID of the <sync>. This ensures that the service knows that the <sync> has been processed in one embodiment.

Generally, those skilled in the art will appreciate that various features of the invention may be practiced alone or in network environments with many types of computer system configurations, including media players, satellite radio receivers, FM transmitters or receivers, DAB transmitters or receivers, personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

Embodiments of the invention may include computer-readable media for carrying or having computer-executable instructions or data structures stored thereon. Such computer-readable media can be any available media that can be accessed by a portable device or general purpose or special purpose computer. By way of example, and not limitation, such computer-readable media can comprise RAM, ROM, EEPROM, CD-ROM or other optical disk storage, magnetic disk or other magnetic storage devices, or any other medium, including solid state storage, which can be used to carry or store desired program code means in the form of computer executable instructions or data structures and which can be accessed by a portable device or general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being processed by computers in network environments. Generally, program modules include acts, routines, programs, objects, components, data structures, etc. that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The device may also include a magnetic hard disk drive for reading from and writing to a magnetic hard disk, a magnetic disk drive for reading from or writing to a removable magnetic disk, or an optical disk drive for reading from or writing to removable optical disk such as CD-ROM or other optical media. The device may also include non-volatile memory including flash memory. The drives and their associated computer-readable media provide nonvolatile storage of computer-executable instructions, data structures, program modules and other data. Although the example environment described herein may employ a magnetic hard disk, a removable magnetic disk and/or a removable optical disk, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a keyboard, pointing device, or other input devices (not shown), such as a microphone, joy stick, touch pad, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as a video adaptor.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In a device management system, a method for transmitting content to one or more electronic devices, the method comprising:
   receiving a service request from an electronic device, the service request containing a device identifier corresponding to the electronic device;
   in response to the service request, using the device identifier, which was contained in the service request, to perform a first query of a first database containing one or more targetable characteristics of the one or more electronic devices, the first database being indexed by device identifiers of the one or more electronic devices;
   identifying, via the first query, targetable characteristics of the electronic device that are associated with the device identifier, which was contained in the service request;
   using the query-identified targetable characteristics of the electronic device to perform a second query of a second database containing a notice of an event, called a bulletin, the bulletin comprising an action, a schedule of an appropriate time for the action to be processed, and one or more targetable characteristics requiring execution of the action, the second database indexed by targetable characteristics of the one or more electronic devices;
   determining, via the second query, that at least one of the query-identified targetable characteristics of the electronic device is included in the one or more targetable characteristics of the bulletin; and
   in response to determining, via the second query, that at least one of the query-identified targetable characteristics of the electronic device is included in the one or more targetable characteristics of the bulletin, transmitting the bulletin, which includes the action and the schedule of an appropriate time for the action to be processed, to the electronic device;
   wherein the action, which is included in the bulletin transmitted to the electronic device, includes a series of commands to be executed by the electronic device; and
   wherein the electronic device is configured to, in response to receiving the bulletin that includes the action and the schedule, execute the series of commands of the action according to the schedule;
   adding the electronic device to a group of electronic devices;
   in response to adding the electronic device to the group, creating a group sync bulletin in the second database which defines dependencies to one or more bulletins pertaining to the group;
   sending a notification to the electronic device that the group sync bulletin has been added to the second database;
   receiving a request from the electronic device for the group sync bulletin;
   sending the group sync bulletin to the electronic device which causes the electronic device to request each of the one or more bulletins pertaining to the group.

2. The method of claim 1, wherein the action associated with the bulletin further includes one or more of: an alert, an asset update, a software update, a change to a registry of the electronic device, and a survey.

3. The method of claim 1, wherein the one or more targetable characteristics of the bulletin comprise one or more of:
   a device category, wherein one or more device identification numbers are associated with the device category;
   a device type, wherein one or more device identification numbers are associated with the device type, a device type being a subset of a device category;
   a partner identification number, wherein each of the device identification numbers has an associated partner identification number assigned by an external partner;
   a device group, wherein one or more device identification numbers are associated with the device group; and
   a pack, the pack including one or more electronic devices having a collection of service software installed thereon.

4. The method of claim 1, further comprising removing the electronic device from the group.

5. The method of claim 1, wherein the bulletin comprises a dependent bulletin and wherein the dependent bulletin transmitted to the electronic device includes a notification to the electronic device that the dependent bulletin is dependent on one or more previous bulletins, the method further comprising, after transmitting the dependent bulletin to the electronic device, receiving a second service request for the one or more previous bulletins.

6. The method of claim 5, further comprising, transmitting the one or more previous bulletins to the electronic device, wherein the electronic device is configured to execute and process the one or more previous bulletins prior to executing and processing the dependent bulletin.

7. In a device management service communicably connectable to one or more electronic devices, wherein each electronic device has an assigned device identification number, a method for transmitting content to an electronic device, the method comprising:
   receiving a service request from an electronic device, the service request including a header containing a device identifier corresponding to the electronic device and information identifying one or more bulletins previously received by the electronic device;
   in response to the service request, using the device identifier, which was contained in the service request, to perform a first query of a first database containing one or more targetable characteristics of the one or more electronic devices, the first database being indexed by device identifiers of the one or more electronic device;

identifying, via the first query, targetable characteristics of the electronic device that are associated with the device identifier, which was contained in the header of the service request;

using both the device identifier and the query-identified targetable characteristics of the electronic device to perform a second query to determine that a new bulletin in a second database of bulletins is currently available for the electronic device, wherein a bulletin comprises an action, a schedule of an appropriate time for the action to be processed, and an identification of one or more groups of electronic devices requiring execution of the action; and in response to determining that the new bulletin in the second database of bulletins is currently available for the electronic device, transmitting the new bulletin, which includes the action and the schedule of an appropriate time for the action to be processed, to the electronic device;

wherein the action, which is included in the new bulletin transmitted to the electronic device, includes a series of commands to be executed by the electronic device; and wherein the electronic device is configured to, in response to receiving the new bulletin that includes the action and the schedule, execute the series of commands of the action according to the schedule;

adding the electronic device to a group of electronic devices;

in response to adding the electronic device to the group, creating a group sync bulletin in the second database which defines dependencies to one or more bulletins pertaining to the group;

sending a notification to the electronic device that the group sync bulletin has been added to the second database;

receiving a request from the electronic device for the group sync bulletin;

sending the group sync bulletin to the electronic device which causes the electronic device to request each of the one or more bulletins pertaining to the group.

8. The method of claim 7, further comprising, prior to transmitting the new bulletin to the electronic device:

sending a response to the service request to the electronic device, the response identifying the new bulletin; and receiving a request for the new bulletin from the electronic device.

9. The method of claim 8, further comprising:

determining that an additional bulletin is currently available for the electronic device; and after transmitting the new bulletin to the electronic device, transmitting the additional bulletin to the electronic device in response to receiving a request for the additional bulletin from the electronic device.

10. The method of claim 7, wherein the new bulletin comprises a smart bulletin, the smart bulletin including components from a plurality of software updates pending for the electronic device, such that transmitting the components to the electronic device in the smart bulletin limits the number of bulletins that are transmitted to the electronic device.

11. The method of claim 7, wherein determining that a new bulletin is currently available for the electronic device comprises:

using the device identifier and one or more targetable characteristics of the electronic device identified in the first database to search the second database indexed by device identifiers and targetable characteristics.

12. The method of claim 7 wherein the group is a group of beta testers.

13. One or more computer storage devices storing computer executable instructions which when executed perform the following method:

receiving a service request from an electronic device, the service request containing a device identifier corresponding to the electronic device;

in response to the service request, using the device identifier, which was contained in the service request, to perform a first query of a first database containing one or more targetable characteristics of the one or more electronic devices, the first database being indexed by device identifiers of the one or more electronic devices;

identifying, via the first query, targetable characteristics of the electronic device that are associated with the device identifier, which was contained in the service request;

using the query-identified targetable characteristics of the electronic device to perform a second query of a second database containing a notice of an event, called a bulletin, the bulletin comprising an action, a schedule of an appropriate time for the action to be processed, and one or more targetable characteristics requiring execution of the action, the second database indexed by targetable characteristics of the one or more electronic devices;

determining, via the second query, that at least one of the query-identified targetable characteristics of the electronic device is included in the one or more targetable characteristics of the bulletin; and in response to determining, via the second query, that at least one of the query-identified targetable characteristics of the electronic device is included in the one or more targetable characteristics of the bulletin, transmitting the bulletin, which includes the action and the schedule of an appropriate time for the action to be processed, to the electronic device;

wherein the action, which is included in the bulletin transmitted to the electronic device, includes a series of commands to be executed by the electronic device; and wherein the electronic device is configured to, in response to receiving the bulletin that includes the action and the schedule, execute the series of commands of the action according to the schedule;

adding the electronic device to a group of electronic devices;

in response to adding the electronic device to the group, creating a group sync bulletin in the second database which defines dependencies to one or more bulletins pertaining to the group;

sending a notification to the electronic device that the group sync bulletin has been added to the second database;

receiving a request from the electronic device for the group sync bulletin;

sending the group sync bulletin to the electronic device which causes the electronic device to request each of the one or more bulletins pertaining to the group.

* * * * *